A. AFANADOR.
AUTOMOBILE CLUTCH.
APPLICATION FILED MAY 1, 1912.

1,070,937.

Patented Aug. 19, 1913.
2 SHEETS—SHEET 2.

Witnesses
Hugh Ott.
P. M. Smith.

Inventor
Angel Afanador
By Victor J. Evans
Attorney

UNITED STATES PATENT OFFICE.

ANGEL AFANADOR, OF PERU, INDIANA.

AUTOMOBILE-CLUTCH.

1,070,937. Specification of Letters Patent. Patented Aug. 19, 1913.

Application filed May 1, 1912. Serial No. 694,395.

*To all whom it may concern:*

Be it known that I, ANGEL AFANADOR, a citizen of the United States, residing at Peru, in the county of Miami and State of Indiana, have invented new and useful Improvements in Automobile-Clutches, of which the following is a specification.

This invention relates to clutches for automobiles, the main object of the invention being to provide a device of this character which will gradually take up motion between the engine and the driving shaft of the machine, so as to entirely overcome the disagreeable and injurious jerking which usually takes place when the clutch is thrown into engagement in an automobile, such jerking movement having a very disagreeable effect upon the occupants of the vehicle, and also having a very injurious effect upon the entire mechanism of the machine.

A further object of the invention is to provide means whereby the gripping efficiency of the clutch may be increased or diminished at will, and compensation made for any wear which takes place between the working surfaces of the clutch.

With the above and other objects in view, the invention consists in the construction, combination and arrangement of parts, as will be hereinafter more fully described, illustrated in the accompanying drawings, and pointed out in the claims hereunto appended.

Figure 1:
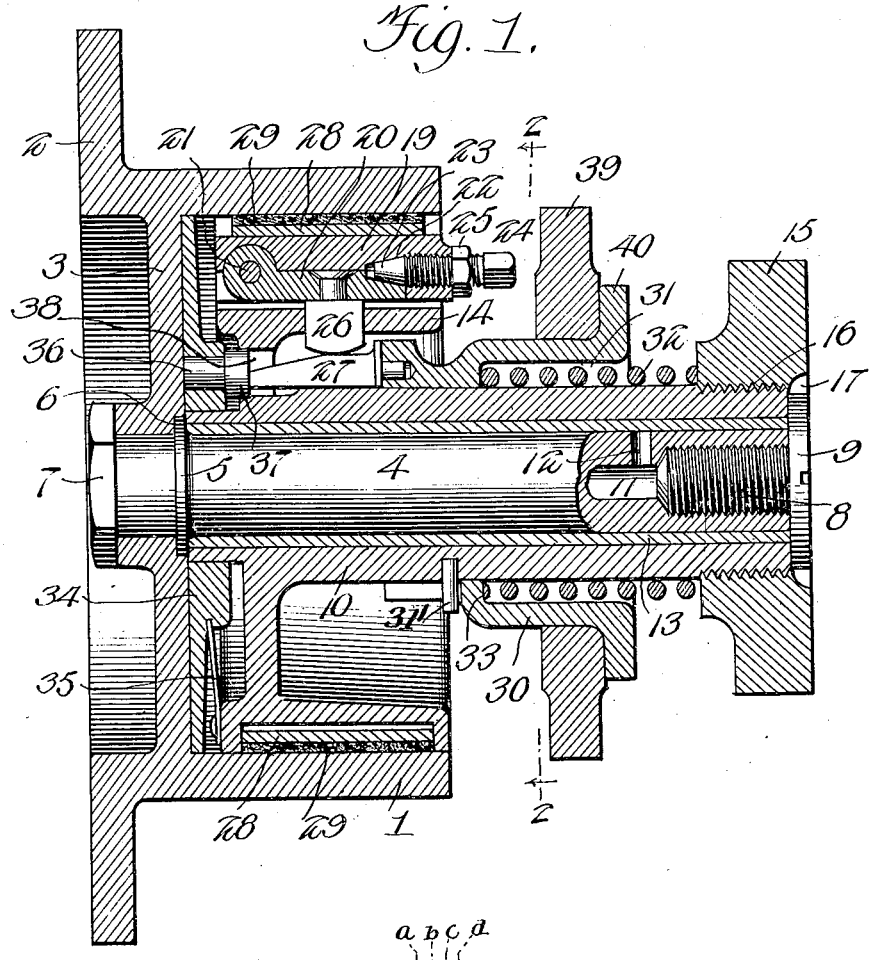
Figure 2:
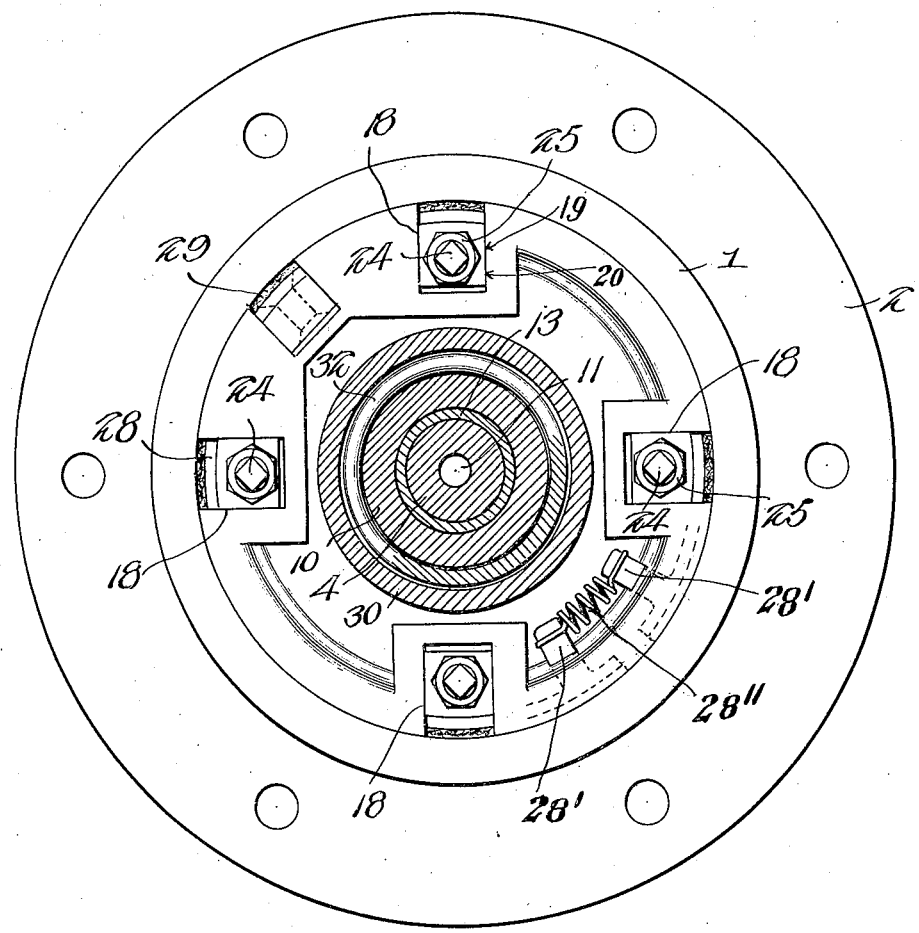
Figure 3:
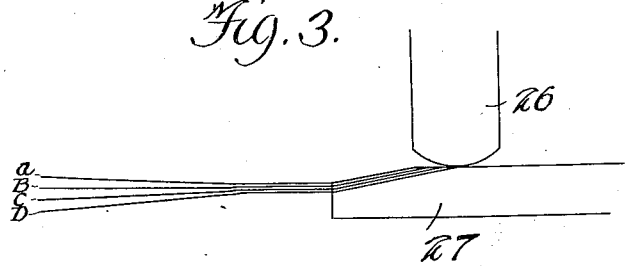

In the drawings: Figure 1 is a longitudinal section through a clutch embodying the present invention, the same being taken in line with the clutch shaft. Fig. 2 is a cross section of the same on the line 2—2 of Fig. 1. Figs. 3 and 4 are diagrammatic views, illustrating the relation which exists between the operating device of the sliding and non-sliding spiders.

The clutch contemplated in this invention comprises essentially a combined clutch rim and housing 1, provided at one end with a flange 2 adapted to be bolted to the fly wheel of the motor of an automobile, so that said combined rim and housing will be practically a part of the fly wheel and rotate therewith. Extending centrally backward from the web or body 3 of said housing is a clutch shaft 4 provided at one end with an annular shoulder 5 let into a recess 6 in the web 3, while the extremity of said shaft is threaded to receive a binding nut 7, by which the shaft is securely fastened to the combined rim and housing. At its opposite end, the shaft is internally threaded to receive a screw 8 having an enlarged head 9 which serves to hold in place the hollow shaft 10 of the non-sliding spider, hereinafter more particularly described.

Extending inward from the threaded opening in which the screw 8 fits is an oil hole 11, extending centrally and lengthwise of the shaft 2 and provided with a lateral port 12, by means of which oil contained in the hole 11 is fed to the outer surface of the shaft 4 for properly lubricating the same. A bushing 13 is preferably disposed around the shaft 4, and within the hollow spider shaft 10.

14 designates what will hereinafter be termed the non-sliding spider, which is provided with the hollow shaft 10, having its bearing on and surrounding the clutch shaft 4, as clearly shown in Fig. 1. This spider shaft is loose on the clutch shaft, and is provided at one end with a coupling or driving flange 15 which is preferably threaded thereon, as shown at 16, so that it may be readily removed, when necessary to take down the clutch as a whole. It will be observed that the head 9 of the screw 8 is received in a rabbet 17 in the coupling flange 15, and that it also abuts against the adjacent end of the spider shaft 10, serving to retain the latter in place, so that while the spider is free to rotate upon the shaft 2 and within the housing 1, it is prevented from moving lengthwise of said shaft.

At a suitable number of intervals around the spider 14, the latter is provided with pockets 18, in each of which is arranged an expander comprising two members 19 and 20 connected together at one end by a pivot 21, while at their opposite ends they are bored in their meeting faces to provide a taper seat 22, in which works the tapered end 23 of an adjusting screw 24, by turning which the members 19 and 20 may be spread apart, for a purpose which will presently appear.

25 designates a lock nut for preventing the screw 24 from working loose, after the same has been properly set to the desired adjustment.

On the inner member 20 of each expander is an inwardly extending stud 26, which is adapted to be engaged by a wedge 27 carried by the sliding spider, hereinafter described. Extending around the non-sliding spider is a clutch band 28 which is lined on its outer side with any suitable material, as shown at 29, to impart to the clutch band the requisite wearing qualities. Any suitable lining material may be employed at this point, such as is in common use with clutches and brakes now employed in connection with automobiles and similar vehicles. The clutch band is provided at its opposite ends with the inwardly extending lugs 28' which are connected by a contractile spring 28", the tension of which is exerted to hold the clutch band normally out of action.

The sliding sleeve 30 surrounds the spider shaft 10 and is keyed thereto by a pin 31' adapted to slide lengthwise thereon, and has attached thereto a number of wedges 27 corresponding to the number of studs 13 carried by the non-sliding spider. The sliding spider 30 is enlarged at one end, as shown at 31, and a coiled thrust spring 32 encircles the shaft 10 and expands between an annular shoulder 33 within the sliding spider and the inner end of the coupling or driving flange 15 above referred to, said spring exerting its tension to force the wedges 27 under the studs 26, and thereby hold the clutch in operative condition.

Just within the web 3 of the combined rim and housing 1, there is arranged an auxiliary clutch plate 34 adapted to bear directly against the web 3, and being slightly offset therefrom or out of actual contact therewith by means of a relief spring 35. The auxiliary clutch plate 34 is provided at the proper intervals with pins 36, the heads 37 of which project beyond the inner face of the clutch plate and are in direct line with the wedges 27, so that when said wedges are thrust inward, passing through apertures 38 in the web of the non-sliding spider, they bear against the heads 37 and force the auxiliary clutch plate into frictional engagement with the web 3 of the housing, thus giving an additional frictional drive and reducing the opportunity for slipping or lost motion between the working faces of the clutch.

39 designates the operating yoke or fork which bears against a circumferential flange 40 on the sliding spider, for shifting said spider in the act of throwing the clutch out of operation.

It will now be observed, by reference to the diagrammatic views, Figs. 3 and 4, that the working faces of the wedges 27 are graduated, as indicated by the leader lines $a$, $b$, $c$ and $d$, so that they take up successively, or one after another, the studs 26, thus gradually or by degrees working the clutch band 28 outward into gripping contact with the inner periphery of the rim or housing. By arranging the wedges to work in this manner, the usual jerking caused by the sudden taking up on the clutch is overcome, relieving the strain on the mechanism of the machine, and also adding materially to the comfort of the occupants of the machine. The wedges 27 are, however, all equal in length, so that they simultaneously bring up at their extremities against the heads 37, and thereby move the auxiliary clutch plate 34 into gripping contact with the inner wall of the web 3 of the rim or housing.

In operation, when the member 39 is moved toward the fly wheel of the engine, the spring 32 acts to thrust the sleeve 30 in the same direction. This causes the wedges 37 to act on the studs 26, and through the expanders, the clutch band 26 is thrust outward into frictional engagement with the member 1, the application of the clutch band being progressive in accordance with the cumulative or progressive action of the wedges which thrust the expanders outward. To disconnect the clutch, the member 39 is moved in the opposite direction, thereby withdrawing the wedges 27 and allowing the contractile spring 28" to contract the clutch band and move the same out of contact with the member 1. In the operative movement of the wedges 2, in addition to acting on the expanders, said wedges come into contact with the stud 37 and force the clutch plate 34 into contact with the web of the member 1.

What is claimed is:

1. An automobile clutch, comprising a housing member adapted to be fastened to the fly wheel of the motor to rotate therewith, a clutch shaft having a fixed relation to said housing member, a non-sliding spider mounted within said housing and having a hollow shaft loosely surrounding the clutch shaft, a coupling flange on said spider shaft, a clutch band encircling said spider and adapted to rotate therewith and arranged to come into contact with said housing, a sleeve mounted to slide on the shaft of the non-sliding spider, expanders interposed between said sleeve and the clutch band, and wedges carried by the sliding sleeve and coöperating with said expanders for throwing the clutch band into driving engagement with said housing.

2. An automobile clutch, comprising a housing member adapted to be fastened to the fly wheel of the motor and rotate therewith, a clutch shaft having a fixed relation to said housing member, a non-sliding spider mounted within said housing and having a hollow shaft loosely surrounding the clutch shaft, a coupling flange on said spider shaft, a clutch band encircling said spider and carried thereby and adapted to contact with said housing, a sleeve mounted to slide on the shaft of the non-sliding spider, expanders interposed between said sleeve and the clutch band, studs on the expanders, wedges carried by said sleeve and adapted to coöperate with the studs on the expanders, and means for adjusting said studs with relation to the clutch band.

3. An automobile clutch, comprising a housing member adapted to be fastened to the fly wheel of the motor to rotate therewith, a clutch shaft having a fixed relation to said housing member, a non-sliding spider mounted within said housing and having a hollow shaft loosely surrounding the clutch shaft, a coupling flange on said spider shaft, a clutch band encircling and carried by said spider and adapted to contact with said housing, a sleeve mounted to slide on the shaft of the non-sliding spider, wedges carried by the sleeve, expanders each comprising two members having a pivotal connection with each other and carried by the spider, studs on the inner members of the expanders, and a tapered screw for effecting a separation between the expander members for the purpose of adjusting the studs relatively to the clutch band.

4. An automobile clutch, comprising a housing member adapted to be fastened to the fly wheel of the motor to rotate therewith, and embodying a body or web portion, a clutch shaft having a fixed relation to said housing member, a non-sliding spider mounted within said housing and having a hollow shaft loosely surrounding the clutch shaft, a coupling flange on said spider shaft, a clutch band encircling and carried by said spider and arranged to contact with said housing, a sleeve mounted to slide on the shaft of the non-sliding spider, coöperating devices on said spider and sleeve for throwing the clutch band into driving engagement with said housing, and an auxiliary clutch plate movable into contact with the web of the housing member and adapted to be actuated by the sliding sleeve.

5. An automobile clutch, comprising a housing member adapted to be fastened to the fly wheel of the motor to rotate therewith and embodying a web or body portion, a clutch shaft having a fixed relation to said housing member, a non-sliding spider mounted within said housing and having a hollow shaft loosely surrounding the clutch shaft, a coupling flange on said spider shaft, a clutch band encircling and carried by said spider and arranged to contact with said housing, a sleeve mounted to slide on the shaft of the non-sliding spider, wedges carried by the sleeve and adapted to force the clutch band into engagement with the housing member, and an auxiliary clutch plate arranged to come into contact with the web or body portion of the housing member and adapted to be actuated by the wedges on the sleeve.

6. An automobile clutch, comprising a housing member adapted to rotate with the fly wheel of the motor, a shaft having a fixed relation to said member, a spider mounted within said member and having a hollow shaft loose on the first named shaft, a coupling flange on the hollow shaft, an internal expanding clutch band encircling the spider and arranged to contact with the housing member, a sleeve mounted to slide on the hollow shaft, and wedges carried by the sleeve and adapted to act progressively on the clutch band.

7. An automobile clutch, comprising a housing member adapted to rotate with the fly wheel of the motor, a shaft having a fixed relation to said member, a spider mounted within said member and having a hollow shaft loose on the first-named shaft, a coupling flange on the hollow shaft, an internal expanding clutch band encircling the spider and arranged to contact with the housing member, a sleeve mounted to slide on the hollow shaft, and wedges carried by the sleeve and adapted to act successively to effect a cumulative engagement of the clutch band.

In testimony whereof I affix my signature in presence of two witnesses.

ANGEL AFANADOR.

Witnesses:
A. A. MILLER,
HARRY O. GUNDERSEN.